United States Patent [19]

Cunningham

[11] 4,216,727
[45] Aug. 12, 1980

[54] PORTABLE TURNTABLE FOR MICROWAVE OVEN

[75] Inventor: Emmett M. Cunningham, Alexandria, Va.

[73] Assignee: Plastics, Inc., St. Paul, Minn.

[21] Appl. No.: 908,087

[22] Filed: May 22, 1978

[51] Int. Cl.² ............... A47B 11/00; A47B 85/00
[52] U.S. Cl. ............................. 108/20; 108/139
[58] Field of Search .................. 74/1.5; 126/338;
312/252, 125, 135; 248/349, 522; 108/139, 20,
142; 99/443 R, 444; 58/123

[56] References Cited

U.S. PATENT DOCUMENTS

| | | |
|---|---|---|
| 176,981 | 5/1876 | Morrison . |
| 274,009 | 3/1883 | Maranville ........................ 126/338 |
| 557,344 | 3/1896 | Shaw . |
| 798,806 | 8/1905 | Adlehelm . |
| 1,926,456 | 9/1933 | Riggs ................................ 58/123 X |
| 2,227,608 | 1/1941 | Tinnerman ....................... 126/338 X |
| 2,351,293 | 6/1944 | Saunders .......................... 248/348 |
| 2,830,862 | 4/1958 | Wright .............................. 126/338 X |
| 2,914,793 | 12/1959 | McMahan, Sr. .................. 108/139 X |
| 3,004,745 | 10/1961 | Wilson .............................. 248/349 |
| 3,302,594 | 2/1967 | Barnett et al. .................... 108/103 X |
| 3,640,142 | 2/1972 | Stafford ............................ 74/1.5 X |
| 3,713,345 | 1/1973 | Sands ................................ 74/1.5 |
| 3,812,316 | 5/1974 | Milburn . |
| 3,909,574 | 9/1975 | Muller et al. . |
| 4,003,368 | 1/1977 | Maxel . |
| 4,013,798 | 3/1977 | Goltsos . |
| 4,036,151 | 7/1977 | Shin .................................. 108/20 |
| 4,037,070 | 7/1977 | Kirpichnikov et al. .......... 99/443 R |
| 4,038,510 | 7/1977 | White . |
| 4,039,796 | 8/1977 | Leibin et al. ..................... 99/443 R |
| 4,053,730 | 10/1977 | Baron . |
| 4,092,512 | 5/1978 | Yamaguchi et al. |

FOREIGN PATENT DOCUMENTS

| | | |
|---|---|---|
| 460489 | 10/1913 | France .............................. 108/20 |
| 51-128141 | 3/1976 | Japan . |
| 51-150557 | 5/1976 | Japan . |
| 52-92454 | 1/1977 | Japan . |
| 52-92464 | 7/1977 | Japan ................................ 108/139 |
| 3990 | of 1893 | United Kingdom ............. 126/338 |
| 12465 | of 1893 | United Kingdom ............. 126/338 |
| 10193 | of 1897 | United Kingdom . |

*Primary Examiner*—James T. McCall
*Attorney, Agent, or Firm*—Price, Heneveld, Huizenga & Cooper

[57] ABSTRACT

A turntable is provided for a microwave oven for rotating foodstuffs placed thereon and effecting uniform heating of the foodstuffs. The turntable includes a base, a rotatable table for receiving foodstuffs, and drive means mounted on the base for rotatably driving the table. The base, table, and drive means are incorporated in a portable, freestanding structure which is adapted for placement and removal from a microwave oven.

10 Claims, 4 Drawing Figures

U.S. Patent    Aug. 12, 1980    4,216,727
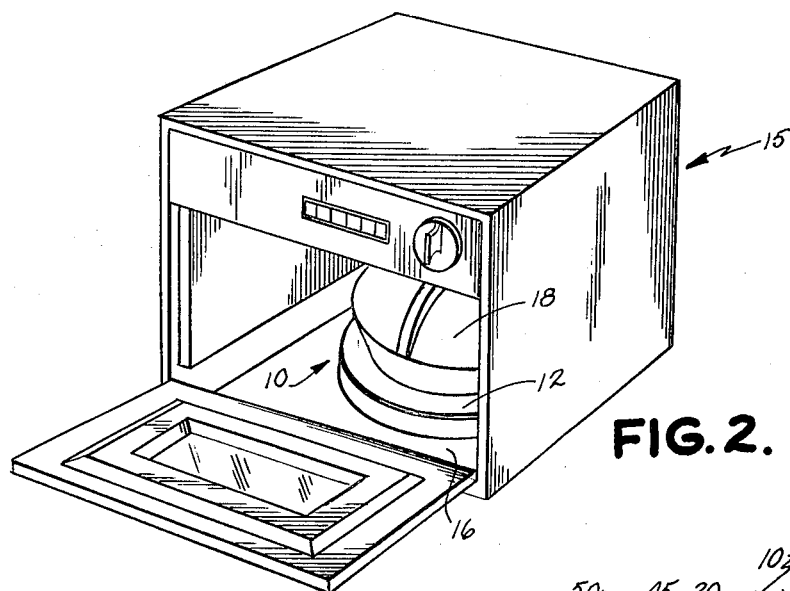
FIG. 2.
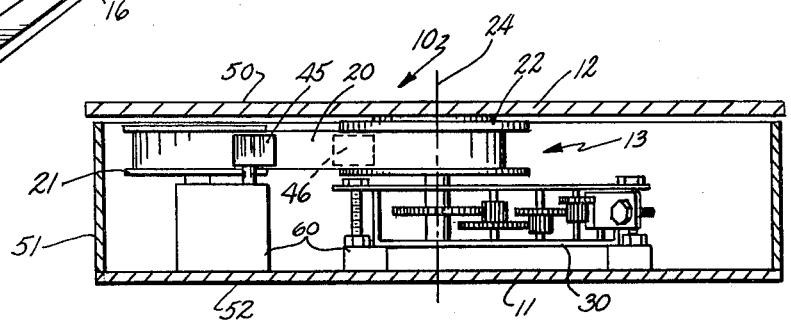
FIG. 1.
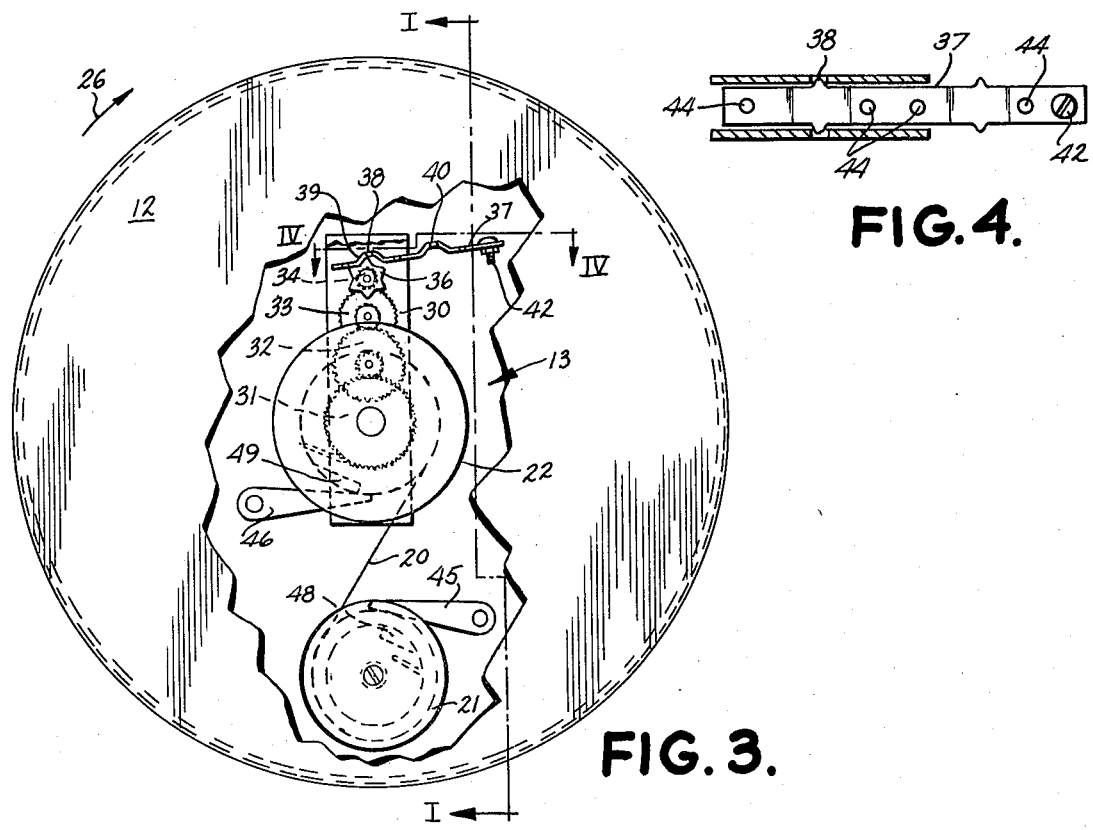
FIG. 4.
FIG. 3.

PORTABLE TURNTABLE FOR MICROWAVE OVEN

BACKGROUND OF THE INVENTION

The invention relates generally to microwave cooking apparatus and, more particularly, to an improved turntable mechanism for use in a microwave cooking oven.

It is known that in the cooking of certain foodstuffs in a microwave oven, hot spots develop in the foodstuff resulting in uneven cooking. In some cases, the result is overcooked areas, as compared to properly cooked portions of the foodstuff, or charred and carbonized areas of the foodstuff. Many instruction booklets accompanying microwave ovens do not discuss this problem directly, but do suggest rotating certain foodstuffs during cooking. The reason for the hot spots in the foodstuff is the inability to achieve a uniform distribution of microwaves in the oven cavity. Rotation of the foodstuff prevents overcooking of the foodstuff due to these localized hot spots.

Prior to applicant's invention, it has been known to incorporate a turntable and drive mechanism in a microwave oven structure. When cooking, foodstuffs are placed on the turntable and the turntable automatically rotates while the foodstuff is irradiated with microwave energy. In fact, such turntables are found in the prior art that include a rotatable table that may be detached from the drive mechanism and removed from the oven for cleaning and for use as a serving dish. However, the cost of building a drive mechanism and/or turntable into an oven structure as disclosed by the prior art is quite costly. Also, such a construction creates crevices or cramped areas in the oven cavity which are difficult to clean, thereby increasing the probability of debris collection and the creation of a generally unsanitary environment in the oven cavity.

In each of the prior art, built-in microwave oven turntables, the microwave oven floor or wall must be provided with a penetration for a drive shaft or the like. This increases the possibility of microwave leakage during operation of the oven and increases the cost of protection against such leakage.

Finally, the prior art does not provide a solution for the housewife with an existing microwave oven without a built-in turntable mechanism. Applicant is unaware of any conversion kit presently marketed for retrofitting an oven without a built-in turntable mechanism. Even if there were such conversion kits, these kits, if patterned after the prior art, would suffer from the same design and economic disadvantages. Thus, there is a need for an improved microwave oven turntable and more particularly, for a microwave oven turntable that is easily adapted for use in existing microwave ovens without a built-in turntable.

SUMMARY OF THE INVENTION

According to the invention, these and other problems with the prior art are solved by providing a portable, freestanding turntable for insertion or removal in a conventional microwave oven. The turntable is free of any structural connection to the microwave oven and comprises an integral structure including a housing, a rotatable table for receiving foodstuffs, and drive means for rotatably driving the table.

In a preferred embodiment of the invention, the drive means comprises a constant force spring motor having an output reel secured to the rotatable table. An escapement mechanism is connected to the output reel for ensuring a constant table rotation speed. The drive means further includes travel restraining means for preventing over-extension of the constant force spring motor. In more narrow aspects of the invention the base and rotatable table are formed from a material having a low dielectric loss and cooperate to provide a cylindrical housing for the drive means. The cylindrical housing has a relatively compact profile, permitting continued use of the greater portion of the volume of the microwave oven cavity.

The principal advantage of the invention is its complete portability and adaptability to a conventional microwave oven of the type not including a built-in turntable. The turntable of the present invention can be used only when desired, thereby eliminating contamination of the turntable when it is not in use. Furthermore, the ability to remove the turntable from the microwave oven permits easier cleaning of the turntable and promotes cleanliness in the oven cavity. Of additional significance is the relatively inexpensive nature of the present turntable as compared to known prior art turntables which are built-in mechanisms.

BRIEF DESCRIPTION OF THE DRAWINGS

FIG. 1 is an elevational view, partially in section, of a turntable constructed according to the present invention;

FIG. 2 is a perspective view of a microwave oven incorporating the turntable of the present invention;

FIG. 3 is a top view, partially in section, of a turntable constructed according to the present invention;

FIG. 4 is a sectional view, taken along line IV—IV of FIG. 3, illustrating a pendulum forming part of the drive means of the present invention.

DESCRIPTION OF THE PREFERRED EMBODIMENTS

Referring to FIG. 1, a sectional view of a turntable 10 constructed according to the present invention is illustrated. The turntable 10 is a portable, freestanding structure including a base 11, a rotatable table 12, and drive means 13 for rotatably driving the table 12. The base 11, the table 12, and the drive means 13 are integrally mounted in a freestanding structure which, as illustrated in FIG. 2, is adapted for placement and removal in a conventional microwave oven generally indicated by the numeral 15. The turntable of the present invention is readily installed in the microwave oven 15 by simply placing the turntable on the floor 16 of the oven 15 and resting foodstuff 18 atop rotatable table 12. When the cooking operation is completed, the turntable 10 may be readily removed from the oven cavity for cleaning and to prevent interference with cooking operations involving foodstuffs that need not be rotated.

Referring now to FIGS. 1 and 2, it is illustrated that in a preferred embodiment, the drive means 13 comprises an energy storing spring motor. In this case, the spring motor comprises a constant force spring 20 wound about a spring storage reel 21. The constant force spring 20 takes the form of a tightly wound roll of strip spring material with high spring properties. The strip spring material is set to a radius in such a manner that it will seek to return to that radius after being pulled straight. Extension of the spring is limited only by the length of the strip spring material of the spring.

In the present case, the strip spring material 20 is wound about spring storage reel 21 in the direction of its set radius. The drive means further includes an output reel 22 which is secured to the rotatable table 12 and is centered on the axis of rotation 24 of the rotatable table 12. The constant force spring 20 is wound about the output reel 22 in a direction bent back away from its set radius. Rotation of the table 12 in the counterclockwise direction wraps a constant force spring 20 backwards around the output reel 22 storing energy in the backwardly bent constant force spring 20. Upon release of the rotatable table 12, the energy stored in constant force spring 20 will tend to rotate the table 12 in a clockwise direction indicated by the arrow 26 in FIG. 3, as the constant force spring 20 seeks to return to its preset radius about storage reel 21. Thus, the constant force spring 20 is applied in a manner that stores and releases energy in the form of a torque which is applied to rotatable table 12.

Similar constant force spring motors are used to store energy for powering escapements in timing devices, movie cameras, etc. Such spring motors are also used to counterbalance where balancing of a load at various positions is required. A constant force spring motor suitable for use in the present invention is commercially available from John Evans & Sons, Inc., of Lansdale, Pa.

The drive means 13 further includes an escapement mechanism 30 which is connected to the output reel 22. The escapement mechanism 30 governs the rate at which energy is released from constant force spring 20 and thus governs the rate of rotation of rotatable table 12. A suitable rate of rotation for the table 12 is generally in a range of 0.25 to 1 revolution per minute. The escapement mechanism comprises a gear step-up transmission including gears 31-34. In a gear step-up transmission, the speed of rotation of the primary gear is multiplied by the transmission gears to produce an output gear rotating at a faster rate than the primary drive. In this case, rotation of the primary drive gear 31 is multiplied many times by transmission gears 32 and 33 such that output gear 34 rotates at a much faster rate than primary gear 31. Output gear 34 includes a star wheel 36 which engages a pendulum 37. The pendulum 37 is pivotable about a point 38 and the star wheel 36 engages a notch 39 in pendulum 37 such that the star wheel 36 may only rotate a predetermined amount with each oscillation or nutation of the pendulum 37. Thus, the natural frequency of oscillation of the pendulum 37 regulates the speed of output gear 34 ensuring a relatively constant predetermined rate of rotation for input gear 31 and rotatable table 12.

Referring now to FIGS. 3 and 4, the pendulum 37 may include means for varying the rate of rotation of the table 12. Means for varying the rate of rotation of the table 12 may comprise one or more of a variety of methods of varying the natural frequency of the pendulum 37. Of course, varying the natural frequency of the pendulum 37 varys the speed of output gear 34, thus varying the speed of rotation of primary gear 31 and the table 12. In ths case, the pendulum 37 may be provided with one or more additional fulcrums, such as the one illustrated at 40, so that the user may vary the pivot point of the pendulum 37 thus varying the natural frequency of oscillation of the pendulum 37 and the speed of rotation of the table 12. In general, movement of the pivot point of the pendulum towards the center of mass of the pendulum will increase its natural frequency and increase the speed of rotation of the table 12. The converse is also true. Alternately, the weight 42 on the end of pendulum 37 may be varied. In general, decreasing or increasing the weight 42 will cause a corresponding increase or decrease in the natural frequency of the pendulum 37. Additionally, means for varying the position of the weight 42 or adding more weight at various positions along the pendulum 37 may be provided, comprising a plurality of apertures 44. In general, whenever the center of mass of pendulum 37 is moved closer to the pivot point, which in the present case is the point 38, by movement of the weight 42 toward the pivot point 38, the natural frequency of the pendulum 37 will be increased. The converse is also true. An escapement suitable for use in the present invention is commercially available from The Aladdin Toy Company, Brooklyn, N.Y.

Referring now to FIGS. 1 and 3, it is illustrated that the drive means further includes first and second travel restraints 45 and 46 associated with storage reel 21 and output reel 22, respectively. The travel restraints 45 and 46 comprise first and second pivotable pawls cooperating with first and second notches 48 and 49 on storage reel 21 and output reel 22, respectively. Normally, notches 48 and 49 are covered by the constant force spring 20 wound about either the storage reel 21 or the output reel 22. However, at the end of travel of the constant force spring 20 in either direction, one of the notches 48 or 49 is uncovered allowing pivotal pawls 45 or 46 to engage respective notches 48 or 49, limiting rotation of the storage reel 21 or the output reel 22. Travel restraints suitable for use with the present invention are commercially available from John Evans & Sons, Inc., Lansdale, Pa.

As best illustrated in FIG. 1, the turntable constructed according to the present invention and generally indicated by the numeral 10 includes a stationary base portion 11 and a rotatable table 12 which cooperate to provide a portable freestanding turntable with the shape of a relatively low profile, right circular cylinder. The right circular cylinder includes a planar top surface 50 for receiving foodstuffs. The top surface 50 is defined by rotatable table 12. The right circular cylinder further includes a curvilinear circumferential surface 51 and a bottom planar surface 52 defined by the base 11. The cylindrical structure thereby created by cooperation between rotatable table 12 and the base 11 provides a housing for completely enclosing and protecting drive means 13 from damage and/or contamination by foodstuffs.

In preferred embodiments of the invention, many of the structural members of the turntable of the present invention are constructed from materials having a low dielectric loss such as certain plastics and wood. For example, in most applications the table 12, the base structure 11, pivoting pawls 45 and 46, storage reels 21 and 22, and many of the minor stuctural platforms such as those illustrated at 60 in FIG. 1, will be constructed from a low dielectric loss material to prevent absorbtion of microwave energy which reduces the cooking efficiency of the oven and causes unwanted heating of the turntable structure.

In the operation of the turntable of the present invention, the user simply turns the table counterclockwise winding constant force spring 20 backward around the output reel connected to the rotatable table to store an appropriate amount of energy for rotating the table. Indicia may be provided on the table and the base to indicate how far to turn the table counterclockwise for a cooking operation of predetermined length. The portable freestanding structure may then be inserted in a conventional microwave oven cavity, the base of the structure resting on the floor of the microwave oven cavity. Because of the relatively low profile of the turntable structure, the bulk of the microwave cavity is still available for insertion of foodstuffs. The foodstuffs to be cooked are placed atop the rotatable table which immediately begins to rotate in a clockwise direction at a predetermined rate when the user releases the table. When the cooking operation is completed, the foodstuff and the turntable may be removed from the oven cavity to allow full use of the oven cavity in subsequent cooking operations and to facilitate cleaning of the turntable. Of particular advantage, the turntable of the present invention may be easily inserted in a conventional microwave oven of the type not including a built-in turntable.

The above description should be considered as exemplary and that of the preferred embodiment only. Many modifications will occur to those skilled in the art. For example, many different types of drive means may be suitable for use with the present invention, although few will be found having the particular advantages of the drive means disclosed in the preferred embodiment. Also, it may be desirable to incorporate a combination serving and cooking tray in the turntable of the present invention. In any case, the true spirit and scope of the present invention should be determined by reference to the appended claims, and it is desired to include within the appended claims all such modifications that come within the proper scope of the invention.

The embodiments of the invention in which an exclusive property or privilege is claimed are defined as follows:

1. A portable self-contained turntable for rotating foodstuffs in a microwave oven cavity comprising:
   a base formed from a low dielectric loss material;
   a table for receiving foodstuffs, said table being formed from a low dielectric loss material and said table being rotatably mounted on said base; and
   drive means mounted on said base for rotatably driving said table from within the oven cavity, said drive means comprising:
   a constant force spring;
   a spring storage reel, said constant force spring being wound on said storage wheel;
   an output reel secured to said table and centered on the axis of rotation of said table; and
   an escapement mechanism connected to said output reel, said escapement comprising:
   a gear step-up transmission;
   a rotatable star wheel, said transmission interconnecting said output reel and said star wheel; and
   a pendulum actuated by rotation of said star wheel.

2. The turntable of claim 1 wherein said pendulum is provided with a plurality of fulcrums for varying the natural frequency of oscillation of said pendulum and thus varying the speed of rotation of said table.

3. The turntable of claim 1 wherein said pendulum is provided with a variable means for varying the natural frequency of oscillation of said pendulum and thus varying the speed of rotation of said table.

4. The turntable of claim 1 wherein said pendulum is provided with a weight and means for varying the position of said weight on said pendulum for varying the natural frequency of oscillation of said pendulum and thus varying the speed of rotation of said table.

5. A portable self-contained turntable for rotating foodstuffs in a microwave oven cavity comprising:
   a base formed from a low dielectric loss material;
   a table for receiving foodstuffs, said table being formed from a low dielectric loss material and said table being rotatably mounted on said base; and
   drive means mounted on said base for rotatably driving said table from within the oven cavity, said drive means comprising:
   a constant force spring;
   a spring storage reel, said constant force spring being wound on said storage wheel;
   an output reel secured to said table and centered on the axis of rotation of said table;
   an escapement mechanism connected to said output reel; and
   first and second travel restraints associated with said storage reel and said output reel, respectively, said first and second travel restraints comprising:
   first and second pivotable pawls cooperating with first and second notches on said storage reel and said output reel, respectively; said first and second notches being covered by said constant force spring except at the ends of travel of said constant force spring.

6. In a microwave oven having a cooking cavity where foodstuffs are irradiated with electromagnetic radiation; the improvement comprising:
   a portable self-contained turntable for rotating foodstuffs within said microwave oven cooking cavity said turntable having:
   a base formed from a low dielectric loss material;
   a table for receiving foodstuffs, said table being formed from a low dielectric loss material, said table being rotatably mounted on said base; and
   drive means mounted on said base for rotatably driving said table from within said microwave without a physical connection extending outside of said microwave oven cavity, said drive means comprising:
   a constant force spring; p1 a spring storage reel, said constant force spring being wound on said storage wheel;
   an output reel secured to said table and centered on the axis of rotation of said table; and
   an escapement mechanism connected to said output reel, said escapement mechanism comprising:
   a gear step-up transmission;
   a rotatable star wheel, said transmission interconnecting said output reel and said star wheel; and
   a pendulum actuated by rotation of said star wheel.

7. The microwave oven of claim 6 wherein said pendulum is provided with a plurality of fulcrums for varying the natural frequency of oscillation of said pendulum and thus varying the speed of rotation of said table.

8. The microwave oven of claim 6 wherein said pendulum is provided with a variable mass for varying the natural frequency of oscillation of said pendulum and thus varying the speed of rotation of said table.

9. The microwave oven of claim 6 wherein said pendulum is provided with a weight and means for varying the position of said weight on said pendulum for varying the natural frequency of oscillation of said pendulum and thus varying the speed of rotation of said table.

10. In a microwave oven having a cooking cavity where foodstuffs are irradiated with electromagnetic radiation; the improvement comprising:
- a portable self-contained turntable for rotating foodstuffs within said microwave oven cooking cavity said turntable having:
- a base formed from a low dielectric loss material;
- a table for receiving foodstuffs, said table being formed from a low dielectric loss material, said table being rotatably mounted on said base; and
- drive means mounted on said base for rotatably driving said table from within said microwave without a physical connection extending outside of said microwave oven cavity, said drive means comprising:
- a constant force spring;
- a spring storage reel, said constant force spring being wound on said storage wheel;
- an output reel secured to said table and centered on the axis of rotation of said table;
- an escapement mechanism connected to said output reel; and
- first and second travel restraints associated with said storage reel and said output reel, respectively, said first and second travel restraints comprising:
- first and second pivotable pawls cooperating with first and second notches on said storage reel and said output reel, respectively; said first and second notches being covered by said constant force spring except at the ends of travel of said constant force spring.

* * * * *